US008184788B2

(12) United States Patent
Kuhtz

(10) Patent No.: US 8,184,788 B2
(45) Date of Patent: May 22, 2012

(54) COMMUNICATION SYSTEM

(75) Inventor: Jan Peter Kuhtz, Celle (DE)

(73) Assignee: Sennheiser electronic GmbH & Co. KG, Wedemark (DE)

(*) Notice: Subject to any disclaimer, the term of this patent is extended or adjusted under 35 U.S.C. 154(b) by 413 days.

(21) Appl. No.: 12/587,493

(22) Filed: Oct. 6, 2009

(65) Prior Publication Data

US 2010/0128893 A1 May 27, 2010

(30) Foreign Application Priority Data

Oct. 7, 2008 (DE) ........................ 10 2008 050 688

(51) Int. Cl.
*H04M 1/00* (2006.01)

(52) U.S. Cl. .................... 379/156; 379/93.09; 702/153; 33/1 CC

(58) Field of Classification Search .................... 381/59, 381/10, 7, 74, 80, 81, 92, 107, 110; 379/67.1, 379/68, 90.01, 93.04, 93.09, 156, 157, 159, 379/165, 184; 345/7, 8, 156, 184; 33/1 M, 33/1 CC; 455/428, 575.2; 702/153; 704/201
See application file for complete search history.

(56) References Cited

U.S. PATENT DOCUMENTS

2003/0130016 A1* 7/2003 Matsuura et al. ............ 455/569
2006/0287014 A1* 12/2006 Matsuura et al. .......... 455/575.2
2008/0030255 A1* 2/2008 Okashita ...................... 327/407
2009/0147993 A1* 6/2009 Hoffmann et al. ............ 382/103
2010/0027808 A1* 2/2010 Hamada et al. ................. 381/92

* cited by examiner

*Primary Examiner* — Vivian Chin
*Assistant Examiner* — Friedrich W Fahnert
(74) *Attorney, Agent, or Firm* — Kilpatrick Townsend & Stockton LLP

(57) ABSTRACT

There is provided a communication system having at least one headset (100) for recording speech signals with a directional information signalling device (1) for detecting directional information. The communication system further has a communication unit (200) which has a direction evaluation unit (2) for evaluating the items of directional information produced by the directional information signalling device. The communication unit further has a channel selection unit (3) for receiving the recorded speech signals (c) and for selecting an output channel (OUT1-OUTi) in dependence on the items of directional information detected and evaluated by the direction evaluation unit (2).

5 Claims, 1 Drawing Sheet

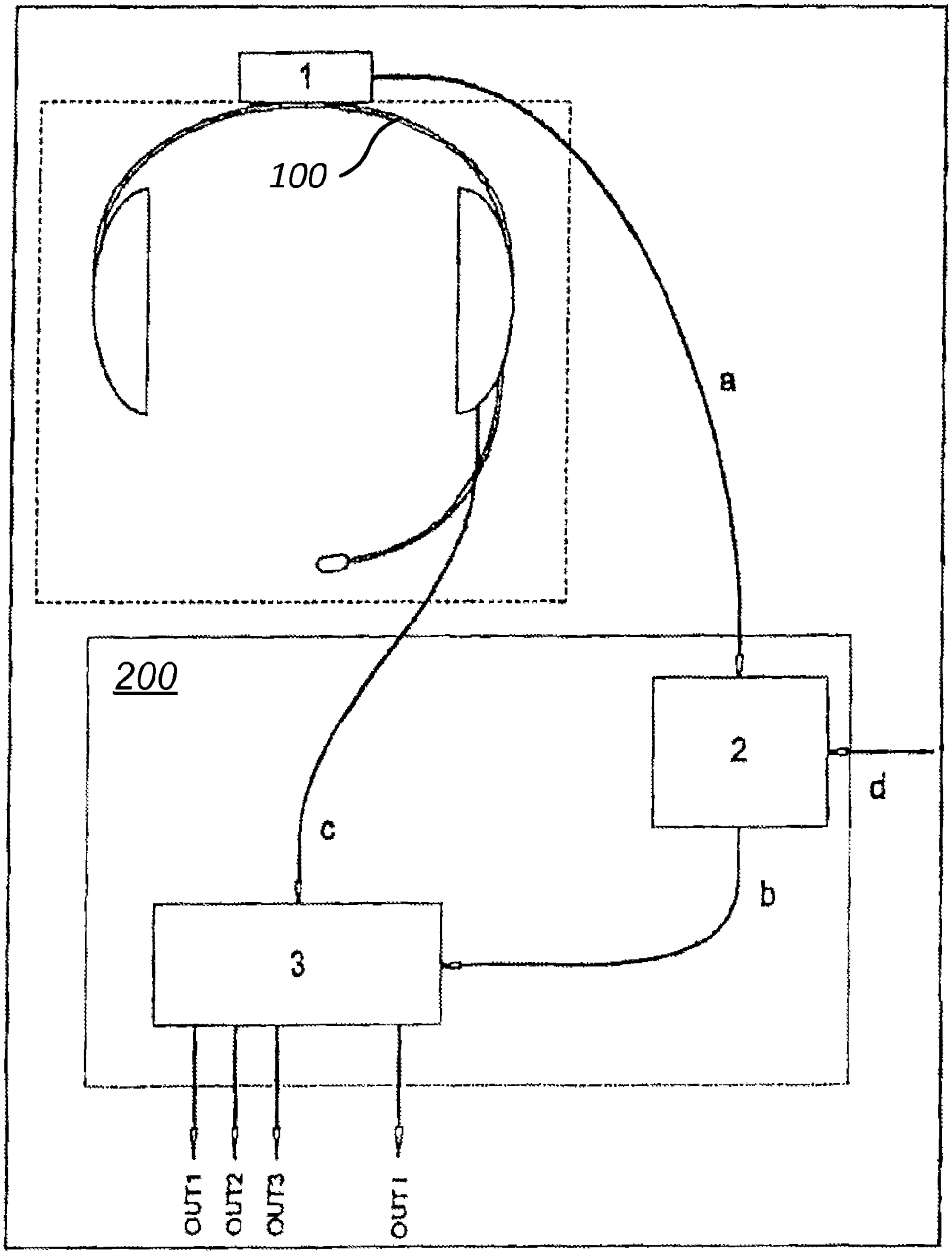
1
100
a
200
2
d
c
b
3
OUT1
OUT2
OUT3
OUT I

COMMUNICATION SYSTEM

CROSS-REFERENCE TO RELATED APPLICATIONS

The present application claims priority to German Patent Application No. 10 2008 050 688.5, filed Oct. 7, 2008, the entire contents of which is herein incorporated by reference for all purposes.

The present invention concerns a communication system.

Particularly in the case of air space surveillance, call centers, emergency call centers and so on the users of a communication system must communicate with a large number of people in the room and with people outside the room. That however can result in a considerable level of noise exposure, which in turn makes it more difficult to understand the communication.

Therefore an object of the present invention is to provide a communication system which permits improved communication intelligibility.

That object is attained by a communication system as set forth in claim 1.

Thus there is provided a communication system having at least one headset for recording speech signals with a directional information signalling device for detecting directional information. The communication system further has a communication unit which has a direction evaluation unit for evaluating the items of directional information produced by the directional information signalling device. The communication unit further has a channel selection unit for receiving the recorded speech signals and for selecting an output channel in dependence on the items of directional information detected and evaluated by the direction evaluation unit.

In accordance with an aspect of the present invention the directional information signalling device is capable of ascertaining a direction of the head of a person wearing the headset.

In accordance with a further aspect of the present invention the direction evaluation unit is capable of converting virtual spatial information out of the items of information from the directional information signalling device.

The present invention also concerns a communication method. Speech signals are recorded by means of a headset and items of directional information are detected. The items of directional information produced are evaluated. The recorded speech signals are received. An output signal is selected in dependence on the items of directional information.

The invention also concerns a communication unit having a first connection for receiving items of directional information from a directional information signalling device on a headset, a second connection for receiving speech signals from a headset, a direction evaluation unit for evaluating the items of directional information and a plurality of output channels. The communication unit further has a channel selection unit for receiving the speech signals and for selecting one of the output channels in dependence on the detected and evaluated items of directional information.

The invention concerns the notion of providing a communication system with which different communication channels are selected by suitable orientation of the head of a user. For that purpose firstly the orientation of the head of the user is determined. By means of that information it is then possible to choose between a multiplicity of communication channels. It is thus possible for a user to specifically and targetedly address one or more other people, more specifically merely by the user looking for example in the direction of the people. If that has been determined by a head position detection unit or by a directional information signalling device, then a suitable channel is selected for the person or a channel associated with the person is selected and switched through so that a corresponding communication can take place.

Alternatively thereto it is also possible to use one channel for all users, wherein only the volume of reproduction is reduced in relation to those persons who are for example not in the direction of viewing of the user.

That can be effected in particular by using the items of directional information in relation to head tracking systems. The channels which are not selected or which are not affected by the items of directional information can be reduced in volume or switched into mute mode.

The communication system according to the invention is advantageous because it improves the orientation of a speaker. In addition a speaker has both hands free to be able to perform other handling operations, for example to be able to operate a keyboard or to write down notes. In addition the speaker does not require a separate push-to-talk switch.

As an alternative to the directional information from a head tracking system, the eye position can also be evaluated to obtain items of directional information. Furthermore the two systems can be combined together.

Further configurations of the invention are subject-matter of the appendant claims.

Advantages and embodiments by way of example of the invention are described in greater detail hereinafter with reference to the drawing.

FIG. 1 shows a diagrammatic view of a communication system according to a first embodiment.

FIG. 1 shows a diagrammatic view of a communication system according to a first embodiment. The communication system has a headset 100 with a head tracking signalling device 1 and a communication unit 200. The items of information a from the head tracker 1 are passed to a direction evaluation unit 2 in the communication unit 200. The communication unit 200 also has a channel splitter or a channel selection unit 3 having a plurality of outputs OUT1-OUTi. Rotation of the head of a person wearing the headset 100 is detected by the head tracker unit 1 and those items of directional information are passed to the direction evaluation unit 2. Those items of directional information are then processed in the direction evaluation unit 2 and an evaluation signal b is outputted to a channel splitter or a channel selection unit 3 which then selects and switches one of the appropriate output channels.

Thus merely by turning the head of a user of the headset according to the invention, it is possible to select an addressee of the communication of the user, in which case the speech signals of the user of the headset go to the addressee by way of a selected audio channel OUT1-OUTi.

An individual item of information can be fed to a subscriber by means of the communication system according to the invention, in which case the other subscribers in the communication system can either also listen or the volume of reproduction can be reduced or switched to mute.

Thus by means of the head position, it is possible to determine by the user of the headset according to the invention which subscriber is directly addressed or with which subscriber communication is to be made. In this case there can be a given head position in which all subscribers are equally addressed or in which the audio signal recorded by the headset is communicated to all subscribers.

As described above evaluation of the items of directional information can be based on the headset of a user by virtue of a head tracker system. In addition thereto the eye position can also be detected and corresponding items of directional information can be extracted. A further example of detecting items of directional information can be represented by a head movement such as for example nodding or shaking.

The signal produced by the signalling device 1 of the head tracker, in respect of the head movement of a person wearing the headset, can be converted in the direction evaluation unit 2 into virtual spatial information with derived directional information. As an alternative thereto the signal produced can be coupled to external directional information from a peripheral system.

The direction evaluation unit 2 produces from the calculated direction a signal in respect of the desired output signal at the channel splitter 3. Thus the speech signal recorded by the headset can be switched to one or more output channels.

Although it is described hereinbefore in relation to FIG. 1 that the communication unit has two inputs, namely an input for the audio signal from the headset and an input for the items of directional information from the head tracker system, the items of directional information from the head tracker system can also be transmitted by way of the first connection together with the audio signals. In such a case the audio signals are also fed to the direction evaluation unit 2 where the items of directional information have to be extracted from the speech signals and subjected to further processing.

The invention claimed is:

1. A communication system comprising:

at least one headset for recording speech signals and having a directional information signalling device for detecting directional information, and a communication unit which has a direction evaluation unit for evaluation of the items of directional information produced by the directional information signalling device and a channel selection unit for receiving the recorded speech signals and for selecting an output channel in dependence on the directional information detected and evaluated by the direction evaluation unit.

2. A communication system as set forth in claim 1 wherein the directional information signalling device ascertains a direction of the head of a person wearing the headset.

3. A communication system as set forth in claim 1 wherein the direction evaluation unit converts virtual spatial information from the items of information from the directional information signalling device.

4. A communication method comprising the steps:

recording speech signals by means of a headset, detecting directional information with respect to the headset, evaluating the detected items of directional information, receiving the speech signals recorded by the headset, and selecting an output channel in dependence on the evaluated items of directional information.

5. A communication unit comprising:

a first input for receiving items of directional information from a directional information signalling device on a headset, a second input for receiving speech signals from a headset, a direction evaluation unit for evaluating the items of directional information, and a channel selection unit for receiving the speech signals and for selecting an output channel in dependence on the detected and evaluated items of directional information.

* * * * *

UNITED STATES PATENT AND TRADEMARK OFFICE

CERTIFICATE OF CORRECTION

PATENT NO. : 8,184,788 B2
APPLICATION NO. : 12/587493
DATED : May 22, 2012
INVENTOR(S) : Kuhtz It is certified that error appears in the above-identified patent and that said Letters Patent is hereby corrected as shown below:

In the Specification:

In the COMMUNICATION SYSTEM section, Column 1, Line 18: please insert a --,-- after "Therefore." Ex: Therefore--,-- an object of the present invention ...

In the COMMUNICATION SYSTEM section, Column 2, Line 64: please insert a --,-- after "above." Ex: As described above--,-- evaluation of the items ...

In the COMMUNICATION SYSTEM section, Column 3, Line 13: please insert a --,-- after "Thus." Ex: Thus--,-- the speech signal ...

Signed and Sealed this
Twenty-eighth Day of August, 2012

David J. Kappos

David J. Kappos
*Director of the United States Patent and Trademark Office*